United States Patent
Yang et al.

(10) Patent No.: US 9,473,182 B2
(45) Date of Patent: Oct. 18, 2016

(54) OPORTUNISTIC INTERFERENCE CANCELLATION OF RADAR SIGNALS

(71) Applicant: Nokia Solutions and Networks Oy, Espoo (FI)

(72) Inventors: Weidong Yang, Hoffman Estates, IL (US); Ravindra Moorut, Tower Lakes, IL (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 14/535,887

(22) Filed: Nov. 7, 2014

(65) Prior Publication Data

US 2016/0134314 A1    May 12, 2016

(51) Int. Cl.
*H04B 1/10* (2006.01)
*G01S 7/02* (2006.01)
*H04W 16/14* (2009.01)

(52) U.S. Cl.
CPC ............ *H04B 1/1027* (2013.01); *G01S 7/023* (2013.01); *H04B 2001/1045* (2013.01); *H04W 16/14* (2013.01)

(58) Field of Classification Search
CPC ..... H04B 1/1027; G01S 7/023; H04W 16/14
See application file for complete search history.

(56) References Cited

U.S. PATENT DOCUMENTS

| | | | |
|---|---|---|---|
| 2002/0090979 A1* | 7/2002 | Sydor | H04W 84/14 455/562.1 |
| 2004/0264977 A1* | 12/2004 | Yap | G02F 2/02 398/161 |
| 2013/0021196 A1* | 1/2013 | Himmelstoss | G01S 7/023 342/159 |
| 2014/0253361 A1* | 9/2014 | Rezk | G01S 7/021 342/16 |
| 2015/0011172 A1* | 1/2015 | Reinhardt | H04B 1/12 455/296 |

OTHER PUBLICATIONS

Van Trees, Harry L., "Optimum Array Processing Part IV of Dection, Estimation, and Modulation Theory", Wiley Interscience, 2002, pp. 1158-1188.

"An Assessment of the Near-Term Viability of Accommodating Wireless Broadband Systems in the 1675-1710 MHz, 1755-1780 MHz, 3500-3650 MHz, and 4200-4220 MHz, 4380-4400 MHz Bands", U.S. Department of Commerce, Oct. 2010, 262 pgs.

\* cited by examiner

*Primary Examiner* — Bobbak Safaipour
*Assistant Examiner* — Devan Sandiford
(74) *Attorney, Agent, or Firm* — Harrington & Smith

(57) ABSTRACT

In accordance with the exemplary embodiments there is at least a method and apparatus to operations including determining, by a communication device, parameters for each of at least one interfering radio signal of a communication signal received by one or more antenna of the communication device; and based on the determined parameters, at least one of suppressing and cancelling the at least one interfering radio signal from the communication signal by the communication device.

19 Claims, 4 Drawing Sheets

3550-3650 MHz NTIA Exclusion Zones*

OPORTUNISTIC INTERFERENCE CANCELLATION OF RADAR SIGNALS

TECHNICAL FIELD

The teachings in accordance with the exemplary embodiments of this invention relate generally to radio signal interference cancellation and, more specifically, relate to radar signal interference cancellation in a shared radio spectrum.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CBS Citizens Band Radio
ESPRIT Estimation of Signal Parameter via Rotational Invariance Technique
FCC Federal Communications Commission
FNPRM Further Notice of Proposed RuleMaking
LTE Long Term Evolution
MUSIC Multiple Signal Classifier
SON Self Organizing Network On Apr. 23, 2014 the Federal Communications Commission (FCC) adopted a Further Notice of Proposed Rulemaking (FNPRM)/Further Consultation aimed at using spectrum sharing techniques to make more spectrum available for wireless broadband services in 3550-3650 MHz also referred to as the 3.5 GHz band hereafter. The spectrum would be available for small-cell and other types of deployments.

The FCC considers this band to be an opportunity to test innovative spectrum-sharing techniques, which could later be extended to other spectrum bands. Access and operation would be managed to avoid interference with existing users of the spectrum by a Spectrum Access System, which is described as a dynamic database that incorporates technical and functional requirements to manage access and operations on the spectrum. It is to be noted that while 3550-3650 MHz is the initial major band for spectrum sharing in the USA, other spectrum bands are expected to follow such as 3100-3550 MHz. In other countries, similar spectrum sharing scenarios could occur in various bands. In this disclosure overcoming interference caused by incumbent spectral users like radar systems in a shared spectrum is addressed.

SUMMARY

In an exemplary aspect of the invention, there is a method comprising: determining, by a communication device, parameters for each of at least one interfering radio signal of a communication signal received by one or more antenna of the communication device; and based on the determined parameters, at least one of suppressing and cancelling the at least one interfering radio signal from the communication signal by the communication device.

In another exemplary aspect of the invention, there is an apparatus comprising at least one processor; and at least one memory including computer program code, where the at least one memory and the computer program code are configured, with the at least one processor, to cause the apparatus to at least: determine, by a communication device, parameters for each of at least one interfering radio signal of a communication signal received by one or more antenna of the communication device; and based on the determined parameters, at least one of suppress and cancel the at least one interfering radio signal from the communication signal by the communication device.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose at least a method and apparatus to address radar signal interference cancellation in a shared radio spectrum.

As stated above the FCC has adopted a Further Notice of Proposed Rulemaking (FNPRM)/Further Consultation aimed at using spectrum sharing techniques to make more spectrum available for wireless broadband services in 3550-3650 MHz. The spectrum would be available for small-cell and other types of deployments.

Figure 1A:
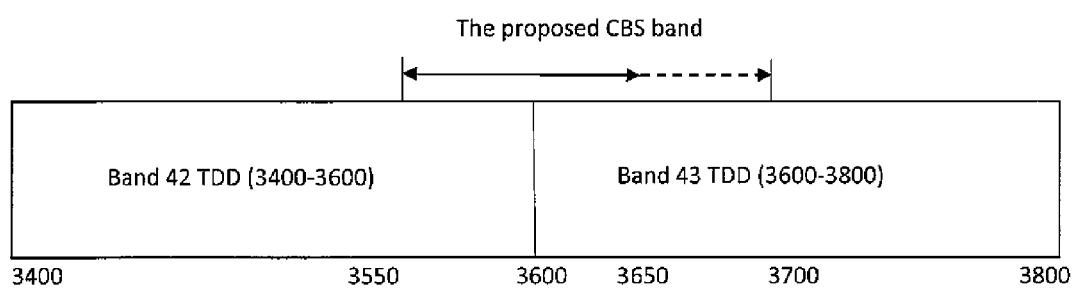
FIG. 1A shows 3GPP Band Class 42 and Band Class 43 in relation to CBS band.

To enable possible deployment around the world, supporting as many regulatory requirements as possible, communication systems are developed for a number of frequency bands by telecommunications standard development organizations worldwide. The 3rd Generation Partnership Project (3GPP) is such a standard development organization developing frequency bands called "Band Classes" for 3GPP technologies like the third generation mobile communication system called Universal Mobile Telecommunications System (UMTS) or fourth generation mobile communication system called Long Term Evolution (LTE). In general, it is preferable if new spectrum is covered by an existing Band Class to avoid having to create a new Band Class since Band Class harmonization helps to achieve economies of scale, enables global roaming, reduces equipment design complexity and improves spectrum efficiency. In this case, there is no existing 3GPP Band Class that is identical to the spectrum under consideration by the FCC. However, existing 3GPP Band Class 42 and 43 would cover the US band entirely. As illustrated in FIG. 1A, the first 50 MHz of the FCC's band, 3550-3600 MHz, is covered by Band 42 and the second 50 MHz, 3600-3650 MHz, is covered by Band 43.

The FCC has proposed to establish a three-tiered authorization framework of Incumbent Access, Priority Access, and General Authorized Access (GAA) tiers. The first tier, Incumbent Access, would include authorized federal users like Navy radars and grandfathered fixed satellite service licensees. These incumbents would be afforded protection from all other users in the 3.5 GHz Band. The second tier, Priority Access, would include critical use facilities, such as hospitals, utilities, government facilities, public safety entities as well as non-critical users such as Mobile Network Operators that would be afforded quality—assured access to the 3.5 GHz Band. The third tier, General Authorized Access, would include all other users—including the general public—that would have the ability to operate in the 3.5 GHz Band subject to protections for Incumbent Access and Priority Access users and can use the spectrum when Incumbent and Priority Access users are not using it.

Figure 1B:
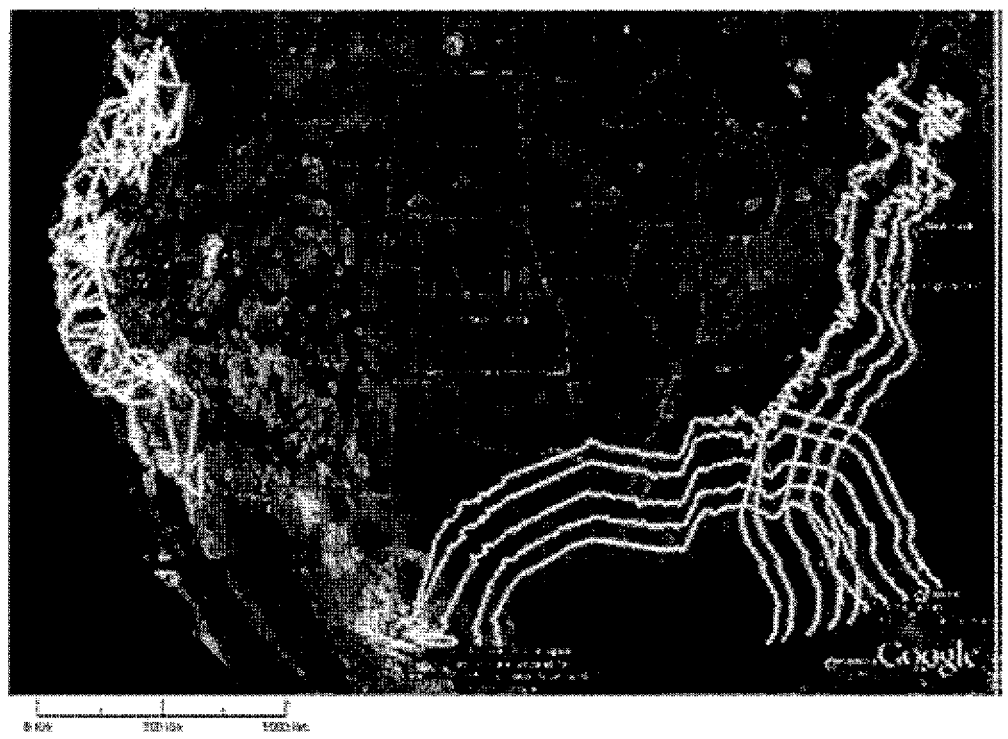
FIG. 1B shows FCC proposed exclusion zones based on a macro deployment.

In addition, as shown with FIG. 1B, the FCC is considering establishing geographic Exclusion Zones >400 km along the coastline based on the models suggested in the National Telecommunications and Information Administration's (NTIA) Fast Track Report. The establishment of these exclusion zones is intended to protect Federal Incumbent Access tier operations which can impact 60 percent of the US population and preventing deployment of LTE in major metro areas like New York, Los Angeles to name only two metro areas. It can be noted that communications of these established zones can cause interference if the band the zones are in is shared and as such can be seen to make the spectrum unattractive for operators to invest and to derive revenues from usage of this band. However, the FCC also said that they plan to reassess these Exclusion Zones in light of new technologies envisioned in this FNPRM and new data from technical studies evaluating the coexistence of radars and wireless broadband systems such as LTE.

At least these FCC proposals may be viewed as a substantial market opportunity for manufacturers and operators to provide systems for use of the 3.5 GHz shared spectrums. However, this opportunity does not come without concerns which may be particularly related to an ability to provide interference avoidance sufficient for usage of the shared spectrum in densely populated areas. The exemplary embodiments of the invention work to address at least these the concern by developing solutions to cancel interference caused by for example incumbent spectral users like radar systems. In addition, the exemplary embodiments of the invention can be used in any frequency range, such as a shared frequency range band, where any desired communications signal are being interfered with by other signals such as radar signals of the band. Further the exemplary embodiments of the invention may be applied to any frequency band in any country. In a non-limiting example the exemplary embodiments of the invention may be used for LTE communications in the shared 3.5 GHz band as referred to in this disclosure.

In LTE systems for example, there are usually at least 2 receive antennas on the UE side and typically two or more receive antennas on the eNB side. In a study conducted under NAICS (Network Assisted Interference Cancellation and Suppression) work item in 3GPP RAN1 in Release 12, several types of advanced UE receivers were compared:

Enhanced IRC (Interference Rejection Combining), which relies on spatial filtering to suppress interference;

SLIC (Symbol Level Interference Cancellation), which uses the information of the interferer's modulation order and channel response to cancel interference; and RML (Reduced complexity Maximum Likelihood), which uses the information of the interferer's modulation order and channel response to form an improved likelihood ratio for the desired signal.

It is quite clear that SLIC or RML outperforms enhanced IRC, and the reason is not difficult to understand as the more knowledge of the interference structure or interference signal itself is obtained by a receiver the better the receiver can compensate for the interference thus leading to a more significantly improved demodulation performance.

With no knowledge of the radar waveform, one has to resort to the spatial filtering methods enabled by multiple receive antennas at the eNB to suppress interference from radar signals. However, in general, only a single external interference source can be suppressed in the spatial domain with just two receive antennas. If there is more than one radar signal interfering at the eNB the UL performance may become unsatisfactory. Hence, there is a need in developing advanced radar interference cancellation methods not limited by the receive antenna number at the eNB. A similar problem can be identified on the UE side.

As indicated above, a known solution to manage access and avoid interference with existing users of the shared spectrum may be based on the exclusion zones which essentially isolate the two systems geographically. However, these exclusions can be very prohibitive. As such better solutions are seen to be needed.

Figure 2:
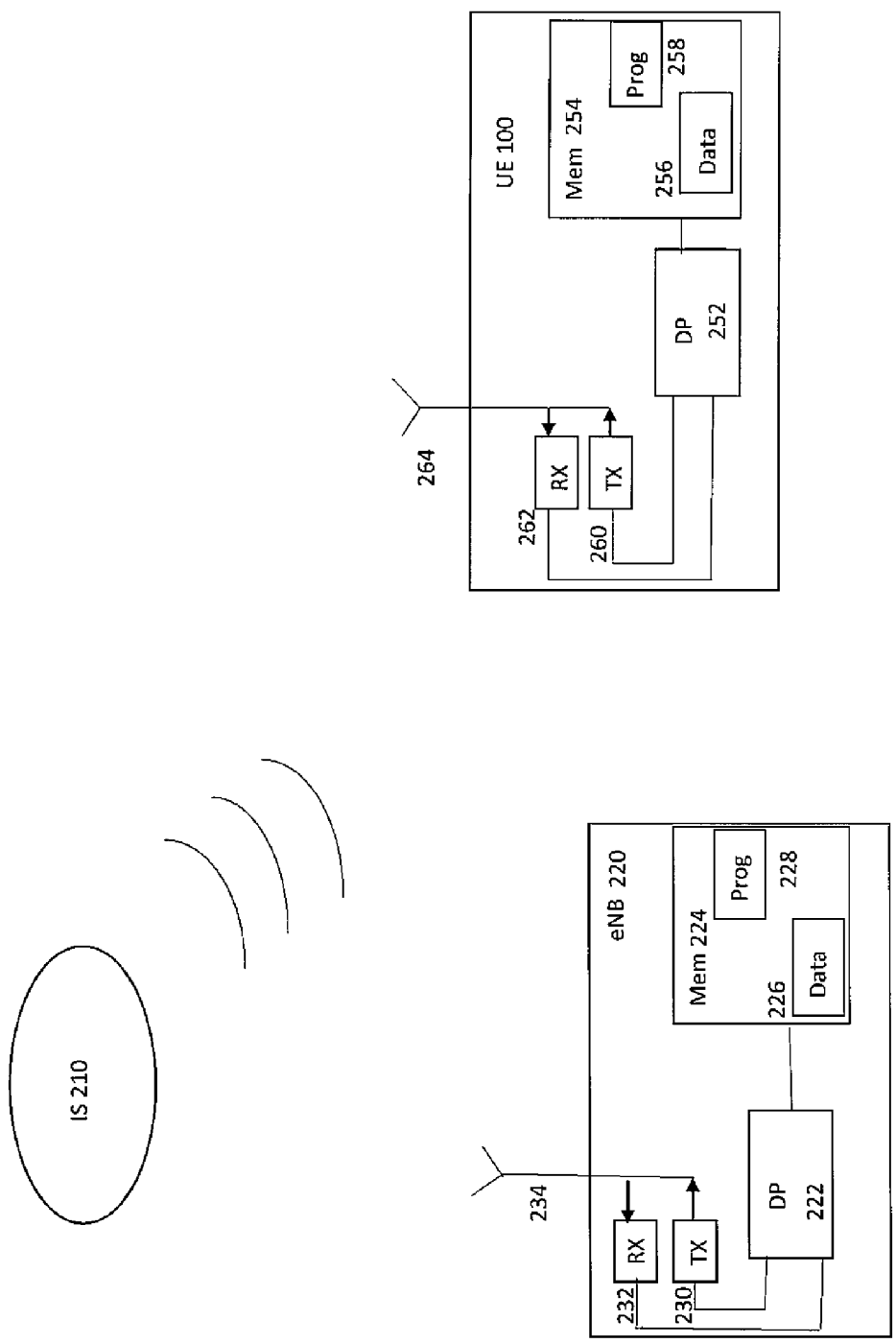
FIG. 2 shows a simplified block diagram of devices configured to perform operations in accordance with the exemplary embodiments of the invention.

Before describing in further detail the exemplary embodiments of the invention reference is now made to FIG. 2. FIG. 2 illustrates a simplified block diagram of communication device such as an eNB 220 and another communication device such as a user device UE 100 both of which may suitable for use in practicing the exemplary embodiments of this invention. In addition, FIG. 2 illustrates an interfering signal source IS 210. The IS 210 can be any device which transmits and/or radiates signals, including signals in the 3550-3650 MHz frequency spectrum. Such signals can include radar signals from any device including a satellite system. The exemplary embodiments of the invention, as can be performed by devices such as the eNB 220 and the UE 100, include at least a method to suppress or cancel these types of signals as in cases where these signals interfere with other communication signals such as in, but not limited to, signals in the 3550-3650 MHz frequency spectrum.

In FIG. 2 apparatuses, such as the eNB 220 and the UE 100 are adapted for communication with other apparatuses such as other communication devices. In addition, it will be recognized that the designations of the eNB 220 and the UE 100 for example and are not made based on any particular hardware or software configurations of the devices themselves.

The eNB 220 includes processing means such as at least one data processor (DP) 222, storing means such as at least one computer-readable memory (MEM) 224 storing data 226 and at least one computer program (PROG) 228 or other set of executable instructions, communicating means such as a transmitter TX 230 and a receiver RX 232 for bidirectional wireless communications with the UE 100 via one or more antenna 234.

The UE 100 includes processing means such as at least one data processor (DP) 252, storing means such as at least one computer-readable memory (MEM) 254 storing data 256 and at least one computer program (PROG) 258 or other set of executable instructions, communicating means such as a transmitter TX 260 and a receiver RX 262 for bidirectional wireless communications with at least the eNB 220 via one or more antennas 264. In addition, the UE 100 may be capable of multiple carrier connectivity and may have multiple transmitters TX 260 and receivers RX 262 to enable simultaneous communication with other devices such as the eNB 220. In addition, it is noted that although FIG. 2 may only illustrate one transmitter TX and one receiver RX in the eNB 220 or the UE 100 this is non-limiting in accordance with the exemplary embodiments. In accordance with the exemplary embodiments of the invention these devices can each be configured to simultaneously support interference cancellation and suppression in multiple RX and/or TX communications with multiple devices. In accordance with the exemplary embodiments the data 226 and/or 256 may include data required to implement a method and operate an apparatus to perform at least the exemplary interference cancellation and suppression as described herein.

At least one of the PROGs 228 in the eNB 220 is assumed to include a set of program instructions that, when executed by the associated DP 222, enable the device to operate in accordance with the exemplary embodiments of this invention, as described herein. In these regards the exemplary embodiments of this invention may be implemented at least in part by computer software stored on the MEM 224, which is executable by the DP 222 of the eNB 220, or by hardware, or by a combination of tangibly stored software and hardware (and tangibly stored firmware).

Similarly, at least one of the PROGs 258 in the UE 100 is assumed to include a set of program instructions that, when executed by the associated DP 252, enable the device to operate in accordance with the exemplary embodiments of the invention, as described herein. In these regards the exemplary embodiments of the invention may be implemented at least in part by computer software stored on the MEM 254, which is executable by the DP 252 of the UE 100, or by hardware, or by a combination of tangibly stored software and hardware (and tangibly stored firmware). Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

In general, the various embodiments of the UE 100 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 224 and 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 222 and 252 include but are not limited to general purpose computers, special purpose computers, microprocessors, digital signal processors (DSPs) and multi-core processors. In addition, the RX 232 and 262 and the TX 230 and 260 of eNB 220 and the UE 100, respectively, can be configured to perform bi-direction communication in at least the 3550-3650 MHz frequency spectrum. Further, as similarly indicated above the operations of at least the components of the eNB 220 and the UE 100 can include the suppression and/or cancellation of interfering radio signals, as in accordance with the exemplary embodiments of the invention.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

Even though the exact waveform of radar signals is not known in the public domain, in many studies it is stated they consist of chirp signals. Recall the definition of a chirp signal means the signal's frequency changes with time. With that, we can hope to boost the LTE receivers' performance when handling radar signals with model based signal processing.

With the knowledge that many radar signals are of the chirp type we exploit the radar waveform's property in the following ways:

Mode 1: • When the radar signal's frequency changes quickly with time, then for all practical purposes the radar signal constitutes a very wideband interference source. In this case, it is difficult to extract useful radar signal characteristics for interference cancellation. The receiver will rely on interference suppression in the spatial domain (i.e. spatial filtering) to reject/suppress radar interference.

Mode 2: • When the radar signal's frequency does not change so quickly in time, a localized model can be extracted, which then can be used to cancel interference. For example, if we assume a radar signal's frequency follows the law $$f(t)=p_1+p_2 t,$$

where $p_1$ is the frequency at $t=0$ and $p_2$ is a slope of frequency change, then the radar signal is given as $$s(t)=ae^{\sqrt{-1}2\pi f(t)t}$$

If parameters $p_1$, $p_2$ and a can be estimated, the estimated signal $$\hat{s}(t)=\hat{a}e^{\sqrt{-1}2\pi(\hat{p}_1+\hat{p}_2 t)t}$$

can be removed from the received signal. This idea can be easily extended to higher order polynomials of frequency dependency on time or to the case of constant frequency. With $f(t)=p_1$, a number of algorithms from array signal processing, such as MUSIC, ESPRIT, etc., or "Detection, Estimation, and Modulation theory, Optimum Array Processing", Harry L Van Trees, Wiley, April 2004), can be used to identify the frequencies of multiple radar signals. We can also explore bases functions other than polynomial bases to improve on the modelling error; for example, sinusoids, wavelets, etc.

Hence an eNB or UE receiver, such as of the eNB 220 and UE 100 of FIG. 2, can start with Mode 2. Then if Mode 2 works substantial gain is reaped. In accordance with the exemplary embodiments a failure in Mode 2 to construct a good model for the radar signal. We can use one example to illustrate this point: assume $f(t)=p_1$, by following the chosen estimation algorithm such as MUSIC or ESPRIT, the estimated interference signal $\hat{s}(t)=\hat{a}e^{\sqrt{-1}2\pi(\hat{p}_1)t}$ is obtained. If the resulted signal after radar signal cancellation is large, then that is used to trigger the UE/eNB receiver to switch to Mode 1.

In accordance with the exemplary embodiments of the invention the past observations of interference can be used to select the optimal bases functions (e.g., between polynomial bases, sinusoids or wavelets . . . ) and order of functions (e.g., a constant, a first order polynomial, a second order polynomial etc.) for opportunistic interference cancellation at each eNB or UE. The statistics on the rate of operating with Mode 1 and Mode 2 can be used to direct the eNB or UE to start with the correct mode. This can be relevant for baseband hotel, in that case lots of baseband processing functions are packed at the same location, and processing power sharing between different function is vital; and the side information provided by Mode 1/Mode 2 can be used to start with the more promising processing chain. For example, in some cases, Mode 1 or Mode 2 processing can be skipped over.

In accordance with the exemplary embodiments it is first assumed that there is a dominant Radar signal in the received signal:

$$r(t)=s(t)+d(t)+n(t),$$

where s(t) is the dominant Radar signal, d(t) is the desired LTE signal, n(t) is from other (weaker) Radar signals and noise. Assume the dominant Radar signal's power is much higher than those for d(t) and n(t). Then there is:

$$r(t) \approx s(t),$$

and a parameter estimation problem is faced. Assume r(t) is sampled at:

$$0, \Delta t, 2\Delta t, 3\Delta t, \ldots$$

Then there is:

$$r_m \approx s_m = ae^{\sqrt{-1}2\pi(p_1\Delta t k + p_2(\Delta t)^2 k^2)}$$

Denote $p_1\Delta t$ by $b_1$ and $p_2(\Delta t)^2$ by $b_2$, then there is:

$$s_k = ae^{\sqrt{-1}2\pi(a_1 k + a_2 k^2)}.$$

Now the following sequence may be formulated:

$$c_{m,n} = s_m \times \text{conj}(s_n) = |a|^2 \exp^{\sqrt{-1}2\pi(a_1(m-n)+a_2(m^2-n^2))}$$

Let m=n+1, there is:

$$c_{n+1,n} = |a|^2 \exp^{\sqrt{-1}2\pi(a_1 + a_2 + 2a_2 n)}$$

In this case, the signal $c_{n+1,n}$ is a signal with digital frequency at $2a_2$. Hence the frequency estimation algorithms or array signal processing algorithms such as MUSIC and ESPRIT can be used to estimate the frequency $2a_2$. Once $a_2$ is estimated, its effect on s(t) can be removed:

$$\tilde{s}_k = s_k \times \text{conj}(e^{\sqrt{-1}2\pi \hat{a}_2 k^2}) = ae^{\sqrt{-1}2\pi(a_1 k + (a_2 - \hat{a}_2)k^2)},$$

As $a_2 - \hat{a}_2$ is small, the same frequency estimation algorithms or array signal processing algorithms can be applied to $\tilde{s}_k$ to estimate $a_1$. From this procedure we have show how $p_1$ and $p_2$ can be estimated.

As a final step, a can be estimated from $$\arg_a \sum_m |r_m - \hat{s}_m|^2,$$

From the above procedure, we provide the algorithm to estimate $p_1$, $p_2$ and a. Once these estimates are obtained, s(t) can be constructed and cancelled-out from the received signal (i.e. interference cancellation is performed).

It is noted that operations in accordance with the exemplary embodiments of the invention such as operations based on a rate of change of a frequency as described herein may be using a threshold value. Further, the threshold value may be preconfigured for a device and/or input to a device, such as a device of FIG. 2, which operates in accordance with the exemplary embodiments. Such inputting of threshold values may be performed with received signalling and/or manual entry at the device and/or may be pre-programmed for a device such as a device of FIG. 2.

Figure 3:
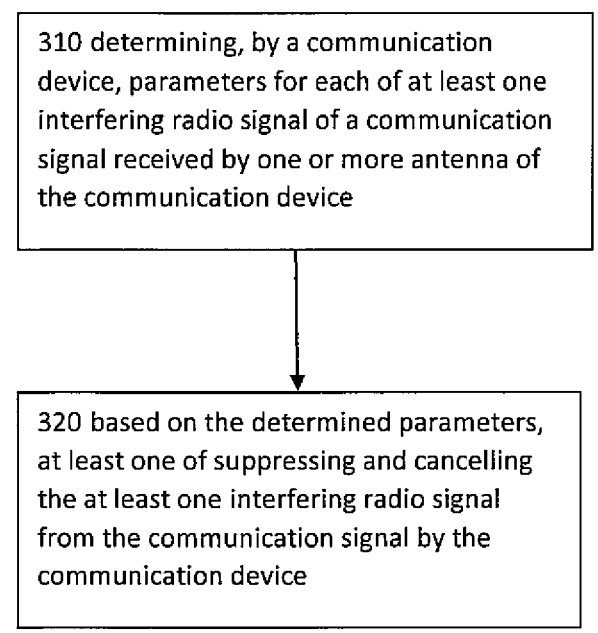
FIG. 3 shows a method in accordance with the exemplary embodiments which may be performed by an apparatus.

FIG. 3 illustrates operations which may be performed by a network device such as, but not limited to devices such as eNB 220 and UE 100 (as in FIG. 2). As shown in step 310 of FIG. 3, there 310 determining, by a communication device, parameters for each of at least one interfering radio signal of a communication signal received by one or more antenna of the communication device. At step 320 there is based on the determined parameters, at least one of suppressing and cancelling the at least one interfering radio signal from the communication signal by the communication device.

In accordance with the exemplary embodiments as described in the paragraph above, the at least one interfering radio signal comprises a radar signal.

In accordance with the exemplary embodiments as described in the paragraphs above, there is determining the parameters of the at least one interfering radio signal comprises at least one of estimating the at least one interfering radio signal and determining a rate of change in a frequency of the at least one interfering radio signal of the communication signal over a period of time.

In accordance with the exemplary embodiments as described in the paragraphs above, the at least one of estimating the at least one interfering radio signal and determining the rate of change in the frequency of the at least one interfering radio signal comprises determining a slope of a frequency change of the at least one interfering radio signal.

In accordance with the exemplary embodiments as described in the paragraphs above, there is based on the determined parameters indicating that a frequency of the at least one interfering radio signal is changing frequently, the method comprising suppressing the at least one interfering radio signal from the communication signal by spatially filtering the estimated at least one interfering radio signal from the communication signal.

In accordance with the exemplary embodiments as described in the paragraphs above, there is based on the determined parameters indicating that a frequency of the at least one interfering radio signal is not changing frequently, the method comprising cancelling the estimated at least one interfering radio signal from the communication signal.

In accordance with the exemplary embodiments as described in the paragraphs above, there is determining that the at least one interfering radio signal has not been sufficiently one of cancelled or suppressed; and based on the determining, one of alternately suppressing or cancelling the at least one interfering radio signal by the communication device.

In accordance with the exemplary embodiments as described in the paragraphs above, there is performing a recursive analysis of the determined parameters for each of the at least one interfering radio signal, the estimated interfering radio signals, and the suppression and cancellation of the interfering radio signals; and based on the recursive analysis selecting optimal base functions and order functions to be used for the at suppressing and cancelling of a next at least one interfering radio signal received by the communication device.

In accordance with the exemplary embodiments as described in the paragraphs above, the selected base functions comprise at least one of polynomial, sinusoid, and wavelet base functions, and wherein the selected order functions comprise at least one of constant, first order polynomial, and second order polynomial order functions.

In accordance with the exemplary embodiments as described in the paragraphs above, the communication signal is received in at least one frequency range where the interfering radio signal is also received.

In accordance with an exemplary embodiment of the invention as described above there is an apparatus comprising: determining [[DP 222] or [DP252], by a communication device [[UE 100] or [eNB 220]], parameters for each of at least one interfering radio signal of a communication signal received by one or more antenna [[234] or [264] of the communication device; and means, based on the determined parameters, for at least one of suppressing and cancelling [[DP 222] or [DP252]] the at least one interfering radio signal from the communication signal by the communication device.

In the exemplary aspect of the invention according to the paragraph above, wherein the means for determining, suppressing, and/or cancelling comprises a non-transitory computer readable medium [MEM 224 and/or 254] encoded with a computer program [PROG 228, and/or 258]; and/or [Data 226 and/or 256] executable by at least one processor [DP 222 and/or 252].

In accordance with the exemplary embodiments of the invention there is an apparatus comprising at least one processor, and at least one memory including computer program code, where the at least one memory and the computer program code are configured, with the at least one processor, to cause the apparatus to at least: determine, by a communication device, parameters for each of at least one interfering radio signal of a communication signal received by one or more antenna of the communication device; and based on the determined parameters, at least one of suppress and cancel the at least one interfering radio signal from the communication signal by the communication device.

In the exemplary aspect of the invention according to the paragraph above, the at least one interfering radio signal comprises a radar signal.

In the exemplary aspect of the invention according to the paragraphs above, the determining the parameters of the at least one interfering radio signal comprises at least one of estimating the at least one interfering radio signal and determining a rate of change in a frequency of the at least one interfering radio signal of the communication signal over a period of time.

In the exemplary aspect of the invention according to the paragraphs above, the at least one of estimating the at least one interfering radio signal and determining the rate of change in the frequency of the at least one interfering radio signal comprises determining a slope of a frequency change of the at least one interfering radio signal.

In the exemplary aspect of the invention according to the paragraphs above, based on the determined parameters indicating that a frequency of the at least one interfering radio signal is changing frequently there is suppressing the at least one interfering radio signal from the communication signal by spatially filtering the estimated at least one interfering radio signal from the communication signal.

In the exemplary aspect of the invention according to the paragraphs above, based on the determined parameters indicating that a frequency of the at least one interfering radio signal is not changing frequently, there is cancelling the estimated at least one interfering radio signal from the communication signal.

In the exemplary aspect of the invention according to the paragraphs above, the at least one memory including the computer program code is configured with the at least one processor to cause the apparatus to determine that the at least one interfering radio signal has not been sufficiently one of cancelled or suppressed; and based on the determining, one of alternately suppress or cancel the at least one interfering radio signal by the communication device.

In the exemplary aspect of the invention according to the paragraphs above, the at least one memory including the computer program code is configured with the at least one processor to cause the apparatus to: perform a recursive analysis of the determined parameters for each of the at least one interfering radio signal, the estimated interfering radio signals, and the suppression and cancellation of the interfering radio signals; and based on the recursive analysis select optimal base functions and order functions to be used for the at suppressing and cancelling of a next at least one interfering radio signal received by the communication device.

In the exemplary aspect of the invention according to the paragraphs above, the selected base functions comprise at least one of polynomial, sinusoid, and wavelet base functions, and wherein the selected order functions comprise at least one of constant, first order polynomial, and second order polynomial order functions.

In the exemplary aspect of the invention according to the paragraphs above, the communication signal is received in at least one frequency range where the interfering radio signal is also received.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   determining, by a communication device, parameters for each of at least one interfering radio signal of a communication signal received by one or more antenna of the communication device, wherein determining the parameters of each of the at least one interfering radio signal comprises estimating a frequency of each the at least one interfering radio signal;
   based on the determined parameters, at least one of suppressing and cancelling the at least one interfering radio signal from the communication signal by the communication device;
   performing a recursive analysis of the determined parameters for at least each of the at least one interfering radio signal, the estimated frequency of each interfering radio signal, and the at least one of suppression and cancellation of the at least one interfering radio signal; and
   based on the recursive analysis, selecting optimal base functions and order functions to be used for suppressing and cancelling of a next at least one interfering radio signal received by the communication device.

2. The method of claim 1, wherein the at least one interfering radio signal comprises a radar signal.

3. The method of claim 1, wherein determining the parameters of the at least one interfering radio signal comprises determining a rate of change in a frequency of the at least one interfering radio signal of the communication signal over a period of time.

4. The method of claim 3, wherein the estimating the frequency of the at least one interfering radio signal and determining the rate of change in the frequency of the at least one interfering radio signal comprises determining a slope of a frequency change of the at least one interfering radio signal.

5. The method of claim 3, wherein based on the determined parameters indicating that the rate of change in the frequency of the at least one interfering radio signal is exceeding a threshold, the method comprising suppressing the at least one interfering radio signal from the communication signal by spatially filtering the at least one interfering radio signal from the communication signal.

6. The method of claim 3, wherein based on the determined parameters indicating that the rate of change in the frequency of the at least one interfering radio signal is not exceeding a threshold, the method comprising cancelling the at least one interfering radio signal from the communication signal.

7. The method of claim 3, comprising determining that a rate of one of cancelling or suppressing the at least one interfering radio signal has not met a threshold; and based on the determining, one of alternately suppressing or cancelling the at least one interfering radio signal by the communication device.

8. The method of claim 1, wherein the selected base functions comprise at least one of polynomial, sinusoid, and wavelet base functions, and wherein the selected order functions comprise at least one of constant, first order polynomial, and second order polynomial order functions.

9. The method of claim 1, wherein the communication signal is received in at least one frequency range where the interfering radio signal is also received.

10. A non-transitory computer readable medium embodying computer program code, wherein the computer program code is executed by at least one processor to perform the method according to claim 1.

11. An apparatus comprising:
    at least one processor; and
    at least one memory including computer program code, where the at least one memory and the computer program code are configured, with the at least one processor, to cause the apparatus to at least:
    determine, by a communication device, parameters for each of at least one interfering radio signal of a communication signal received by one or more antenna of the communication device, wherein determining the parameters of each of the at least one interfering radio signal comprises estimating frequency of each the at least one interfering radio signal;
    based on the determined parameters, at least one of suppress and cancel the at least one interfering radio signal from the communication signal by the communication device;
    perform a recursive analysis of the determined parameters for each of the at least one interfering radio signal, the estimated frequency of each interfering radio signal, and the at least one of suppression and cancellation of the at least one interfering radio signals; and
    based on the recursive analysis, select optimal base functions and order functions to be used for suppressing and cancelling of a next at least one interfering radio signal received by the communication device.

12. The apparatus of claim 11, wherein the at least one interfering radio signal comprises a radar signal.

13. The apparatus of claim 11, wherein determining the parameters of the at least one interfering radio signal comprises determining a rate of change in a frequency of the at least one interfering radio signal of the communication signal over a period of time.

14. The apparatus of claim 13, wherein the determining the rate of change in the frequency of the at least one interfering radio signal comprises determining a slope of a frequency change of the at least one interfering radio signal.

15. The apparatus of claim 13, wherein based on the determined parameters indicating that the rate of change in the frequency of the at least one interfering radio signal is exceeding a threshold, the method comprising suppressing the at least one interfering radio signal from the communication signal by spatially filtering the estimated at least one interfering radio signal from the communication signal.

16. The apparatus of claim 13, wherein based on the determined parameters indicating that the rate of change in the frequency of the at least one interfering radio signal is not exceeding a threshold, the method comprising cancelling the at least one interfering radio signal from the communication signal.

17. The apparatus of claim 13, wherein the at least one memory including the computer program code is configured with the at least one processor to cause the apparatus to determine that a rate of one of cancelling or suppressing the at least one interfering radio signal has not met a threshold;

and based on the determining, one of alternately suppress or cancel the at least one interfering radio signal by the communication device.

18. The apparatus of claim 11, wherein the selected base functions comprise at least one of polynomial, sinusoid, and wavelet base functions, and wherein the selected order functions comprise at least one of constant, first order polynomial, and second order polynomial order functions.

19. The apparatus of claim 11, wherein the communication signal is received in at least one frequency range where the interfering radio signal is also received.

* * * * *